(12) United States Patent
Kolmykov-Zotov et al.

(10) Patent No.: US 7,847,789 B2
(45) Date of Patent: Dec. 7, 2010

(54) REDUCING ACCIDENTAL TOUCH-SENSITIVE DEVICE ACTIVATION

(75) Inventors: Alexander J. Kolmykov-Zotov, Sammamish, WA (US); Emily K. Rimas-Ribikauskas, Seattle, WA (US); Matt Lerner, Seattle, WA (US); Reed Townsend, Seattle, WA (US); Steven P. Dodge, Sammamish, WA (US); Leroy B. Keely, Portola Valley, CA (US)

(73) Assignee: Microsoft Corporation, Redmond, WA (US)

(*) Notice: Subject to any disclaimer, the term of this patent is extended or adjusted under 35 U.S.C. 154(b) by 1331 days.

(21) Appl. No.: 10/994,385

(22) Filed: Nov. 23, 2004

(65) Prior Publication Data

US 2006/0109252 A1 May 25, 2006

(51) Int. Cl.
*G06F 3/041* (2006.01)
(52) U.S. Cl. .................. 345/173; 178/18.03
(58) Field of Classification Search ......... 345/173–180; 178/18.01–20.04
See application file for complete search history.

(56) References Cited

U.S. PATENT DOCUMENTS

| | | | |
|---|---|---|---|
| 4,972,496 A | 11/1990 | Sklarew | 382/187 |
| 5,375,076 A | 12/1994 | Goodrich et al. | 361/681 |
| 5,825,675 A | 10/1998 | Want et al. | 708/142 |
| 5,900,875 A | 5/1999 | Haitani et al. | 345/840 |
| 5,956,020 A * | 9/1999 | D'Amico et al. | 345/173 |
| 6,020,878 A | 2/2000 | Robinson | 345/173 |
| 6,054,979 A | 4/2000 | Sellers | 345/173 |
| 6,107,997 A | 8/2000 | Ure | 345/173 |
| 6,295,052 B1 | 9/2001 | Kato et al. | 345/179 |
| 6,429,846 B2 | 8/2002 | Rosenberg et al. | 345/156 |
| 6,498,601 B1 | 12/2002 | Gujar et al. | 345/173 |
| 6,628,269 B2 * | 9/2003 | Shimizu | 345/173 |
| 6,727,892 B1 | 4/2004 | Murphy | 345/173 |
| 6,771,250 B1 | 8/2004 | Oh | 345/156 |
| 6,888,536 B2 * | 5/2005 | Westerman et al. | 345/173 |
| 7,190,348 B2 * | 3/2007 | Kennedy et al. | 345/168 |
| 2001/0012001 A1 * | 8/2001 | Rekimoto et al. | 345/173 |
| 2001/0013861 A1 * | 8/2001 | Shimizu | 345/173 |
| 2002/0015024 A1 * | 2/2002 | Westerman et al. | 345/173 |
| 2003/0080946 A1 * | 5/2003 | Chuang | 345/173 |
| 2003/0210235 A1 * | 11/2003 | Roberts | 345/173 |
| 2004/0027338 A1 | 2/2004 | Lampson | 345/173 |
| 2004/0032399 A1 * | 2/2004 | Sekiguchi et al. | 345/173 |

* cited by examiner

*Primary Examiner*—Quan-Zhen Wang
*Assistant Examiner*—Robert R Rainey
(74) *Attorney, Agent, or Firm*—Shook, Hardy & Bacon L.L.P.

(57) ABSTRACT

Aspects of the present invention reduce the number of false positive touch inputs made by a non-stylus object such as the user's finger or hand. When the stylus is located proximate to the touch-sensitive surface, the sensitivity of the surface to non-stylus input is disabled, reduced, or otherwise modified. For example, non-stylus inputs may be ignored while the stylus is within a proximity zone defined near the touch-sensitive surface. Further aspects of the present invention are directed to adjusting the threshold requirements of a non-stylus input depending upon where on the touch-sensitive surface the input is made. Still further aspects of the present invention are directed to calibrating various sensitivity thresholds for non-stylus input, as well as the size and/or shape of the proximity zone.

14 Claims, 8 Drawing Sheets

View A-A

REDUCING ACCIDENTAL TOUCH-SENSITIVE DEVICE ACTIVATION

FIELD OF THE INVENTION

Aspects of the present invention are directed generally to management of stylus-based input versus non-stylus-based input to a touch-sensitive device, and in particular to reducing the effect of unintentional non-stylus-based input to a touch-sensitive device.

BACKGROUND OF THE INVENTION

Touch-sensitive surfaces are rapidly becoming more common in computing devices. They are very convenient as they allow a user to make natural gestures familiar to the user in other contexts, such as by entering handwriting using a stylus. Many of these devices also allow input to be provided by non-stylus objects, such as a user's fingertip. The term touch-sensitive surface or device will be used herein to refer to such surfaces or devices that are configured to detect the touch of a stylus and/or a non-stylus object. While generally a convenient feature, a disadvantage to this dual sensitivity to both a stylus and a non-stylus object such as the user's finger is that it is likely that the user will, from time to time, unintentionally touch the touch-sensitive surface with the user's finger, hand, etc., while handling the device or writing on the device using a stylus. For example, while using the stylus to write, the user may rest his or her hand on the touch-sensitive surface, and/or brush the hand against the surface. This may also happen while the user is holding or otherwise handling the device.

There is therefore a need to address this problem inherent to touch-sensitive devices sensitive to both stylus-based input and non-stylus-based input.

SUMMARY OF THE INVENTION

Aspects of the present invention address the above problem by reducing the number of false positive touch inputs made by a non-stylus object such as the user's finger or hand. When the stylus is located proximate to the touch-sensitive surface, the sensitivity and/or responsiveness of the surface to non-stylus input is disabled, reduced, or otherwise modified. For example, non-stylus inputs may be ignored while the stylus is within a proximity zone defined near the touch-sensitive surface. As another example, the threshold size, pressure, capacitance, and/or shape required for a non-stylus input to be successfully accepted may depend upon whether the stylus is within or outside the proximity zone. This aspect of the invention may further be generalized to operate with other input methods. For example, the opposite may be true such that, in certain situations, it may be appropriate to ignore stylus inputs while a non-stylus object is within the proximity zone. Thus, throughout this disclosure the concept of a stylus and a non-stylus object may be reversed and still be within the scope of this invention. Or, another type of input, such as a voice input to a microphone, may cause a stylus input or a non-stylus input to be ignored.

Further aspects of the present invention are directed to adjusting the threshold requirements of a non-stylus input depending upon where on the touch-sensitive surface the input is made. For example, non-stylus inputs made on or near a user-selectable displayed object, such as a displayed button, may be easier to make (i.e., have lower threshold requirements) than such inputs made in an area away from any displayed object. Or, for example, non-stylus inputs made in an area where they are not expected, such as a defined inking area, is more likely to be interpreted as an unintentional touch and therefore more likely to be ignored.

Still further aspects of the present invention are directed to calibrating various sensitivity thresholds for non-stylus input, as well as the size and/or shape of the proximity zone.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

An Illustrative Computing Environment

Figure 1:
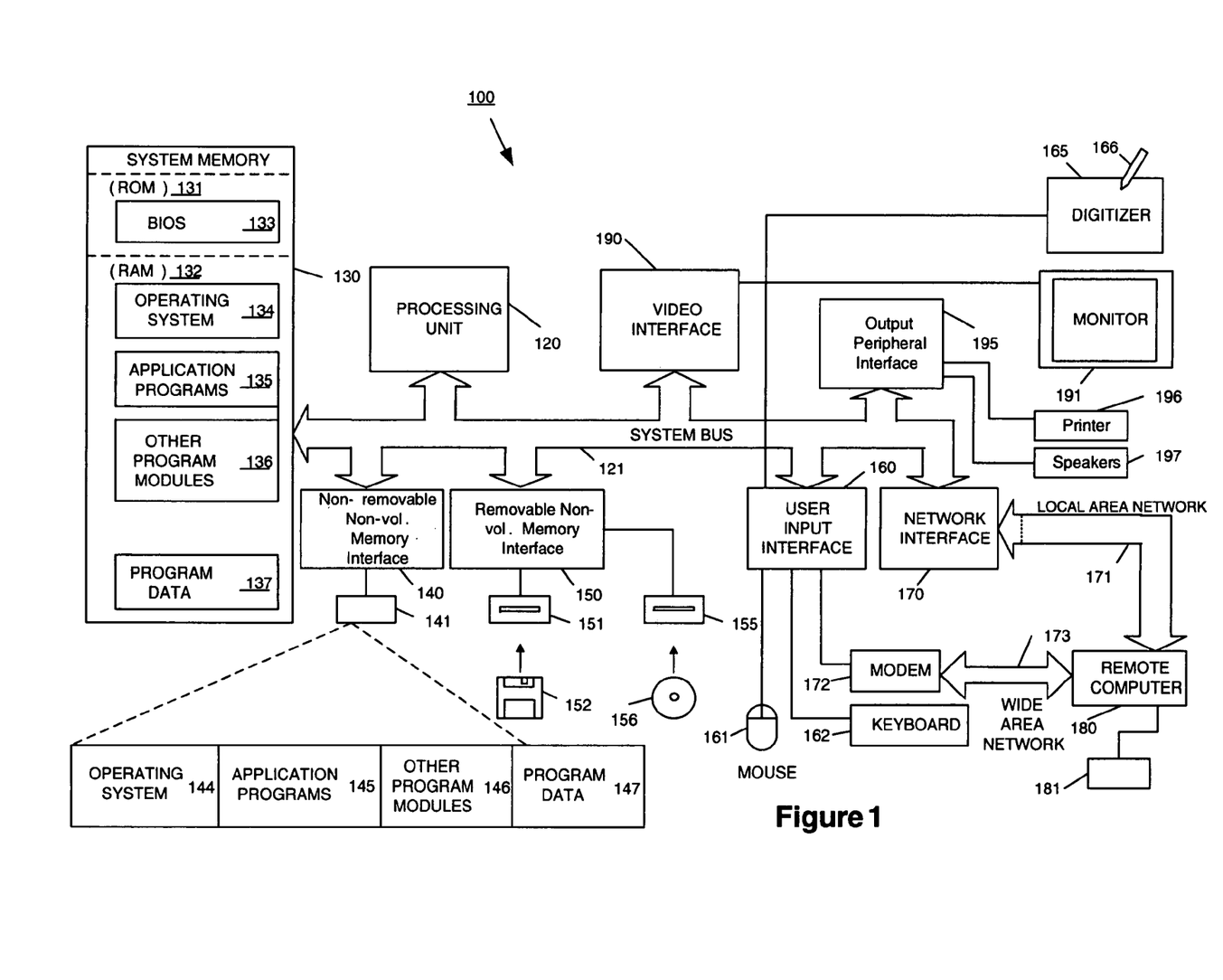
FIG. 1 is a functional block diagram of an illustrative computing environment that may be used with aspects of the present invention.

Aspects of the present invention may be used in connection with a computing device such as the computer 100 illustratively shown in FIG. 1. Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. Data stored on any of the various computer storage media may be stored in a variety of formats. For example, data may be stored as discrete portions such as files or other items. An electronic file system, which may be part of the operating system 134 and/or separate from it, may be responsible for managing the storage, retrieval, and/or searching of items and other data on the computer storage media. The electronic file system may be implemented as software, hardware, and/or firmware.

A user may enter commands and information into the computer 100 through input devices such as a touch-sensitive device 165, or a keyboard 162 and/or a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

In some aspects, a touch-sensitive device 165 and accompanying pen or stylus 166 are provided in order to digitally capture freehand input. Although a direct connection between the touch-sensitive device 165 and the user input interface 160 is shown, in practice, the touch-sensitive device 165 may be coupled to the processing unit 120 directly, via parallel port or another interface, or via the system bus 121 by any technique, either wired or wirelessly. The stylus 166 may further have other sensing systems for determining strokes of electronic ink including, e.g., accelerometers and magnetometers. In addition, the touch pad may be sensitive to non-stylus mechanical input, such as input from a user's finger. Touch-sensitive devices that are sensitive to stylus input and/or to human touch input are known.

The computer 100 may operate in a networked environment using logical connections to one or more remote computers, such as a remote computer 180. The remote computer 180 may be a personal computer (such as a desktop computer, a laptop computer, or a tablet-style computer), a handheld computer (e.g., a personal digital assistant), a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. The computer 100 may further include wired and/or wireless capabilities. For example, the network interface 170 may be BLUETOOTH, SWLan, and/or IEEE 802.11 compatible. It is appreciated that other wireless communication protocols may be used in conjunction with these protocols or in place of these protocols.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism.

As discussed, the touch-sensitive device 156 may be a device separate from or part of and integrated with the computer 100. In addition, any or all of the features, subsystems, and functions discussed in connection with FIG. 1 may be included in, coupled to, or embodied integrally as part of, a tablet-style computer. For example, the computer 100 may be configured as a tablet-style computer where the touch-sensitive device 156 is the main user interface. Such a configuration is referred to in FIGS. 2, 3, 4, and 6, indicating that the device shown there may be considered both the computer 100 and the touch-sensitive device 165. Tablet-style computers are well-known. Tablet-style computers interpret gestures input to the touch-sensitive device 165 using the stylus 166 in order to manipulate data, enter text, create drawings, and/or execute conventional computer application tasks such as spreadsheets, word processing programs, and the like. Input may not only be made by the stylus 166, but also by other non-stylus objects such as a human finger or a non-stylus object held by a user.

Proximity Sensing

Figure 2:
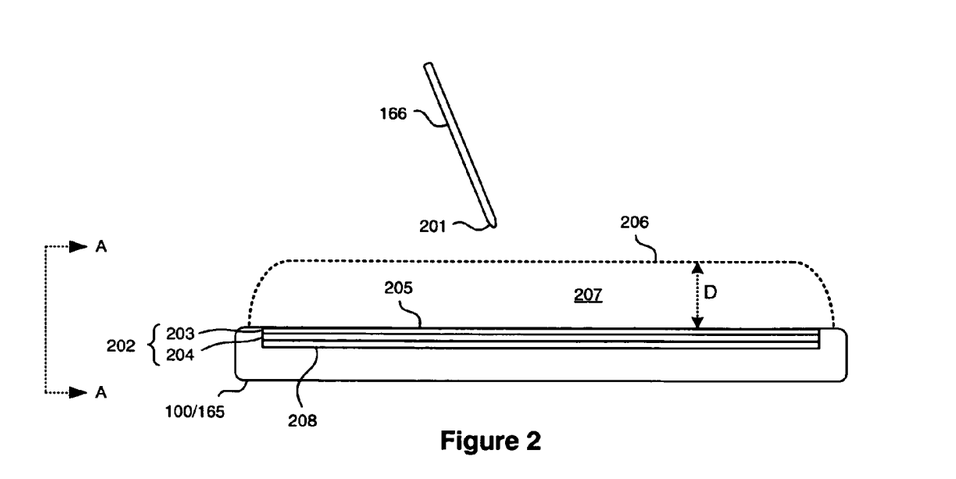
FIG. 2 is a side view of an illustrative touch-sensitive device showing a stylus outside the proximity zone in accordance with aspects of the present invention.

Referring to FIG. 2, the touch-sensitive device 165 may include a sensing portion 202 having a touch-sensitive surface 205, which in turn may include both a stylus-sensitive portion 203 and a non-stylus sensitive portion 204. Although portion 203 is shown disposed above portion 204 in this example, their relative positions are unimportant; they may be reversed or in any other relative configuration. The two portions 203 and 204 may even be integral with one another and physically the same portion. In such embodiments, the designation of two separate portions 203 and 204 is purely functional. Whatever the physical configuration used, the cumulative effect of the two portions 203 and 204 is that the sensing portion 202 as a whole is sensitive to both the stylus input and non-stylus input. Stylus input is caused by interaction between the stylus 166 and the sensing portion 202. Non-stylus input is caused by interaction between an object other than the stylus 166, such as a human hand, finger or other body part, or any other object. The interaction for both stylus input and non-stylus input may be contacting-type or non-contacting type. For example, input may include contacting-type input where the stylus 166 or a human finger physically contacts the touch-sensitive surface 205. Contacting-type input may include contact remaining in one location on the touch-sensitive surface 205 (e.g., tapping for a short time or holding for a longer time) or sliding laterally across the touch-sensitive surface 205. Non-contacting-type input results from sensing the proximity of an object without the object actually physically contacting the touch-sensitive surface 205. For example, the stylus-sensitive portion 203 may sense the fact that the stylus 166 is proximate to (and may be able to measure the distance of the stylus) the touch-sensitive surface 205 without the stylus 166 actually physically contacting the touch-sensitive surface 205. Input where a stylus is near but not touching a touch-sensitive surface is commonly referred to as hovering. Such sensing/locating technologies are well known and currently used in several tablet-style computers.

The sensing portion 202 may be sensitive to, and able to distinguish between stylus and non-stylus input. To accomplish this, various different sensing technologies may be utilized for each of portions 203 and 204. For example, the stylus-sensitive portion 203 may be an electromagnetic digitizer that senses the stylus 166 but not non-stylus objects such as a human finger or hand, and the non-stylus sensitive portion 204 may be a capacitive touchpad that is sensitive to the moisture content of an object such as human skin but is not sensitive to the stylus 166 (assuming that the stylus 166 is configured so as not to be detectable by capacitive touchpad technology). Other touch-sensitive and/or hover-sensitive technologies include optical sensing such as pressure-sensitive touch digitizers that utilize two optically transparent conductive layers separated by a non-conductive liquid or air space, radar sensing, and sonic beam sensing. Again, such sensing/locating technologies are well known.

Each of the portions 203 and 204 may generate its own signal depending upon what that portion senses. In particular, the stylus-sensitive portion 203 may generate a first signal that depends upon the position of the stylus 166 relative to the stylus-sensing portion 203, and the human-touch sensitive portion 204 may generate a second signal that depends upon the position, pressure, capacitance, and/or surface area of touch (such as by a human hand, finger, or other body part) relative to the human-touch sensitive portion 204. Many touch-sensitive devices 165 use capacitance and/or surface area to determine pressure. The touch sensitive device 165 may output the first and second signals separately or as a single combined signal.

The touch-sensitive device 165 may further have or be integrated with a display 208. The display 208 may be aligned such that input provided to the sensing portion 202 results in appropriate visual feedback on the display 208. Such a configuration is commonly used in tablet-style computers and touch-sensitive displays in general. The display may be any type of display such as a cathode ray tube (CRT) display or a liquid-crystal display (LCD). Although the touch-sensitive device 165 is shown in a horizontal position, suitable for tablet-style computers, the touch-sensitive device 165 may be oriented in any position. For example, the touch-sensitive device 165 may be the display for a laptop or desktop computer.

Figure 3:
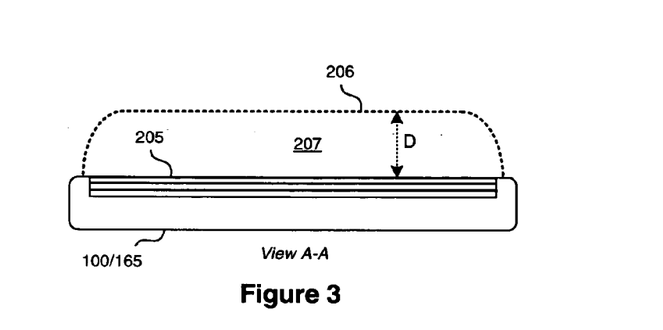
FIG. 3 is a different side view of the touch-sensitive device of FIG. 2.

FIG. 3 is another side view of the touch-sensitive device 165, but from the point of view A-A in FIG. 2. As shown in FIGS. 2 and 3, a proximity zone 207 may be defined relative to the touch-sensitive surface 205. As will be discussed below, user interface features may be disabled, enabled, and/or modified depending upon whether the stylus is within the proximity zone 207 or outside the proximity zone 207. Present-day electromagnetic touch-sensitive devices, for example, are able to sense the position and/or distance of a hovering object, such as a stylus, proximate to the device. The proximity zone 207 is not a physical entity that the user can see but instead is a defined space, albeit not necessarily a well-defined space. The proximity zone 207 may be of any shape. For example, the proximity zone 207 may have a lower boundary defined by the touch-sensitive surface 205 and an upper boundary 206 defined as a plane having a constant distance D measured in a direction normal to the touch-sensitive surface 205. In other words, the upper boundary 206 may generally be a plane parallel to and distance D from the touch-sensitive surface 205. Distance D may be any amount of distance, such as about 6 centimeters, less than 6 centimeters such as from 2 to 3 centimeters, or more than six centimeters. D may further be set to be a distance such that while a user writes with the stylus 166 on the touch-sensitive surface 205, the stylus 166 does not leave the proximity zone 207. In other words, distance D may be at least a long as the distance that the user lifts the stylus 166 between writing words without lifting the user's hand. Alternatively, distance D may be defined as the maximum distance that the stylus 166 might be from the touch-sensitive surface 205 when the user's palm contacts or rests on the touch-sensitive surface 205 for writing. Distance D may be user-defined and/or automatically defined by software running on the computer 100. The upper boundary 206 is illustratively shown as a well-defined boundary, but it may be less well-defined such as where the proximity zone 207 is defined by whether or not the touch-sensitive device 165 is able to detect the stylus 166. This is because the hover sensitivity and detection accuracy of the touch-sensitive device 165 may gradually drop off with distance from the touch-sensitive surface 205.

Distance D may be of a sufficiently small distance such that stylus and/or non-stylus x,y hover coordinates may still be measured and/or reported by the touch-sensitive device 165 within the proximity zone 207. The x,y location over which the stylus 166 is hovering may be used, for example, as a factor in determining whether a non-stylus input should be ignored. Or, distance D may be of a large enough distance such that the x,y hover coordinate of the stylus 166 or a non-stylus object may not be reliably measurable in certain portions of the proximity zone 207, even though the presence of the stylus 166 or the non-stylus object within the proximity zone 207 is still detectable.

As shown, the side boundaries of the proximity zone 207 may taper toward the touch-sensitive device 165 near the edges of the touch-sensitive surface 205. This may be a natural physical effect caused by the boundaries of the touch-sensitive surface 205 and the particular characteristics of the electric, magnetic, optical, and/or sonic field (for example) used by the touch-sensitive device 165. However, any boundaries for the proximity zone may be defined. For example, the upper boundary 206 of the proximity zone 207 need not be planar as shown but may have a varying topography that depends upon the relative location over the touch-sensitive surface 205.

Alternatively, the proximity zone 207 may not be defined by particular boundaries but instead as the space in which the mere presence of the stylus 166 would be detected by the touch-sensitive device 165. This may be useful where the touch-sensitive device 165 is able to detect the presence, but not the distance, of the hovering stylus 166 within a certain range from the touch-sensitive surface 205. As yet another alternative, the stylus 166 may transmit a signal into and through the user's hand such that the capacitive touch signal from the hand is modified. In such a case, the touch-sensitive device 165 may be configured to detect, based on that signal in the hand, whether the user is holding the stylus 166 while the hand is touching the touch-sensitive surface 205.

Figure 4:
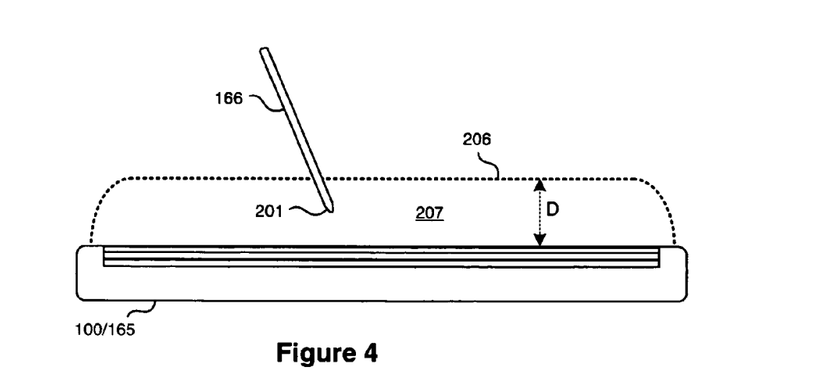
FIG. 4 is a side view of the touch-sensitive device of FIG. 2 showing a stylus within the proximity zone in accordance with aspects of the present invention.

To determine whether the stylus 166 is within or outside the proximity zone 207, the position and/or proximity of a smaller representative portion of the stylus 166 may be measured. For example, determining whether the stylus 166 is within or outside the proximity zone 207 may equate to determining whether a tip 201 of the stylus 166 is within or outside of the proximity zone 207. FIG. 2 shows the tip 201, and thus effectively the stylus 166 itself, to be outside the proximity zone. FIG. 4 shows the tip 201, and thus effectively the stylus 166 itself, to be within the proximity zone. Other representative portions of the stylus 166 may be used, such as a point located a certain distance up the stylus 166 from the tip 201. The tip 201 (or any other portion of the stylus 166) may include a sensor, emitter (e.g., radio frequency such as BLUETOOTH or infra-red emitter), or a material (e.g., magnetic material or a metal) different from a remainder of the stylus 166, that allows the relative position and/or proximity of the tip 201 to be sensed by the touch-sensitive device 165, which may also include a matched sensor and/or emitter as appropriate. Moreover, the stylus 166 and the touch-sensitive device 165 may communicate either wirelessly or via a wired communication path. Such stylus configurations are well known and are used with a number of devices such as tablet-style computers.

Figure 5:
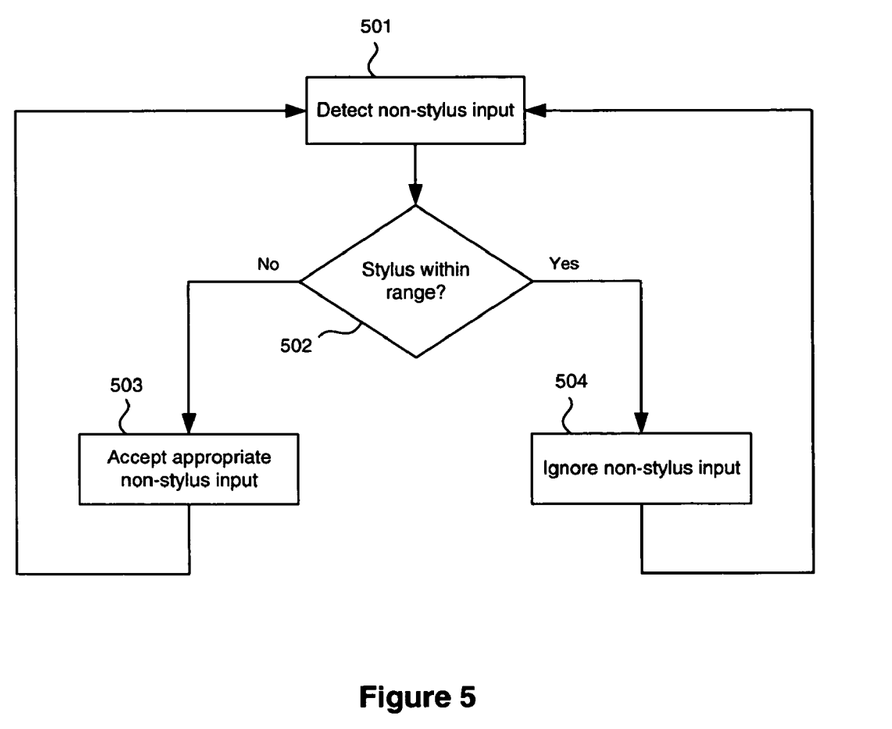
FIG. 5 is a flowchart showing illustrative steps that may be taken to handle non-stylus input in accordance with aspects of the present invention.

The position of the stylus 166 relative to the touch-sensitive surface 205 may determine which types of input may be provided to the touch-sensitive device 165 and/or the computer 100. FIG. 5 illustrates an example of this. As previously discussed, the touch-sensitive device 165 is sensitive to and distinguishes between stylus input and non-stylus input, such as human hand or finger. In step 501, the touch-sensitive device 165 in this instance detects non-stylus input. Whenever non-stylus input is detected, the touch-sensitive device 165 and/or the computer 100 may determine in step 502 whether the stylus 166 is within or outside the proximity zone 207. For example, it may be determined whether the tip 201, which may represent the stylus 166 as a whole, is within or outside the proximity zone 207. If the stylus 166 is outside the proximity zone 207, then in step 503 the non-stylus input may be accepted normally. However, if the stylus 166 is within the proximity zone 207, then in step 504 the non-stylus input may be ignored. The non-stylus input may be ignored in a number of ways. For example, where the touch-sensitive device 165 normally generates signals representing input, the touch-sensitive device 165 may prevent such signals from being generated or output that represent non-stylus input while the stylus 166 is within the proximity zone 207. Alternatively, such signals may be generated and output regardless of whether the styus 166 is within the proximity zone 207. In this case, such signals may be ignored by the computer 100 or may be used by the computer 100 to make a determination as to whether to ignore a non-stylus input or to apply a particular threshold requirement to the non-stylus input. Thus, the touch-sensitive device 165 and/or the computer 100 may ignore such non-stylus input through hardware and/or software ignoring of the input. In addition, a software application running on the computer 100 may be able to override any default behavior that may be set by hardware and/or software. For example, a calculator application having large displayed buttons that does not accept handwritten input may choose not to ignore non-stylus input regardless of the proximity of the stylus 166. As another example, a painting application may likewise choose to accept non-stylus input regardless of the proximity of the stylus 166, where the stylus 166 is used to lay down virtual "pigment" and the user's hand or finger is used to smudge the pigment. To allow for such flexibility, an application program interface (API) may be provided for the use of such applications that allows applications to turn on and off, or adjust, the feature of ignoring non-stylus input.

When non-stylus input is ignored, the effect of such input is different from what the effect would have been had such input not been ignored. For instance, ignored input may simply have no effect on the user interface experience, as though the input never occurred. As an example, a particular function that would ordinarily be performed in response to a stylus or non-stylus input, such as dragging a displayed object or moving a displayed pointer (e.g., via a sliding gesture of the stylus 166 or a non-stylus object across the touch-sensitive surface 205), selecting an object (e.g., via a tap of the stylus 166 or a non-stylus object against the touch-sensitive surface 205). However, the function may not be performed, or a different function may be performed, in response to that same gesture by a non-stylus object if the stylus 166 is within the proximity zone 207 while the non-stylus gesture is being made. The reasoning behind this is that such a non-stylus gesture is likely to be unintentional or have a different purpose. Ignored input may be indicated to the user via a feedback mechanism, e.g., a displayed icon or message, or an audible sound.

Figure 8:
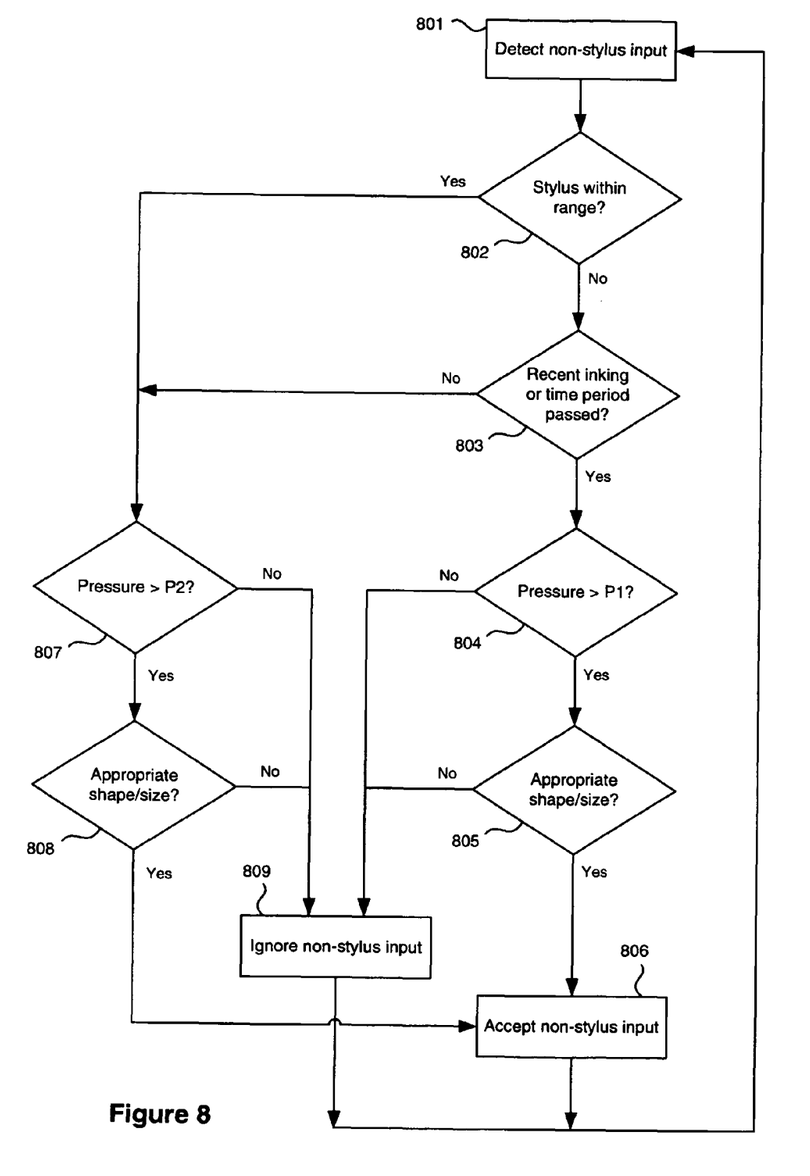
FIG. 8 is a flowchart showing illustrative steps that may be taken to handle non-stylus input in accordance with aspects of the present invention.

As will be discussed later in connection with FIG. 8, variations may be performed in this basic decision flow. For example, instead of completely ignoring non-stylus input, non-stylus input may be subject to special filtering when the stylus 166 is within the proximity zone 207.

Non-Stylus Input Profile Analysis

Figure 6:
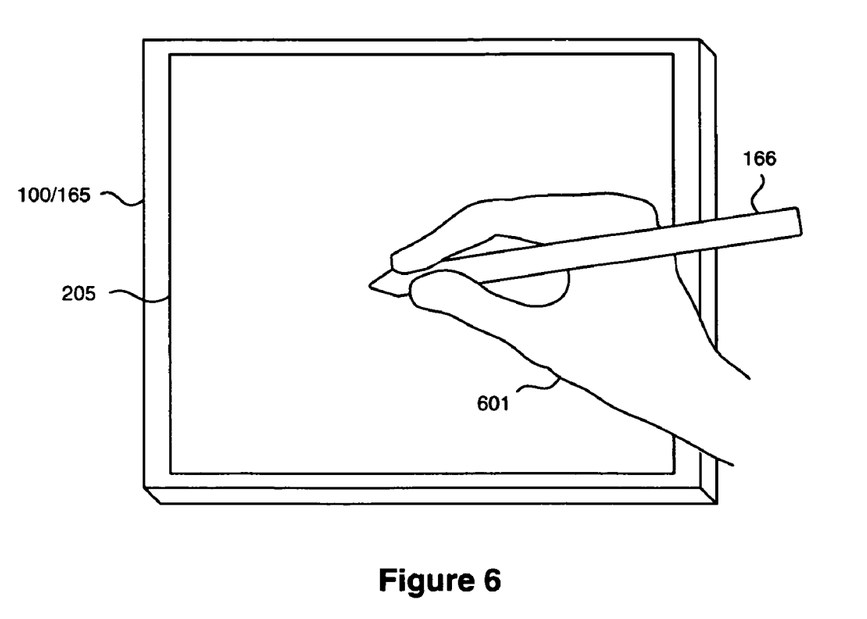
FIG. 6 is a plan view of the touch-sensitive device of FIG. 2 illustrating how a user's hand might rest on a touch-sensitive surface of the device.
Figure 7:
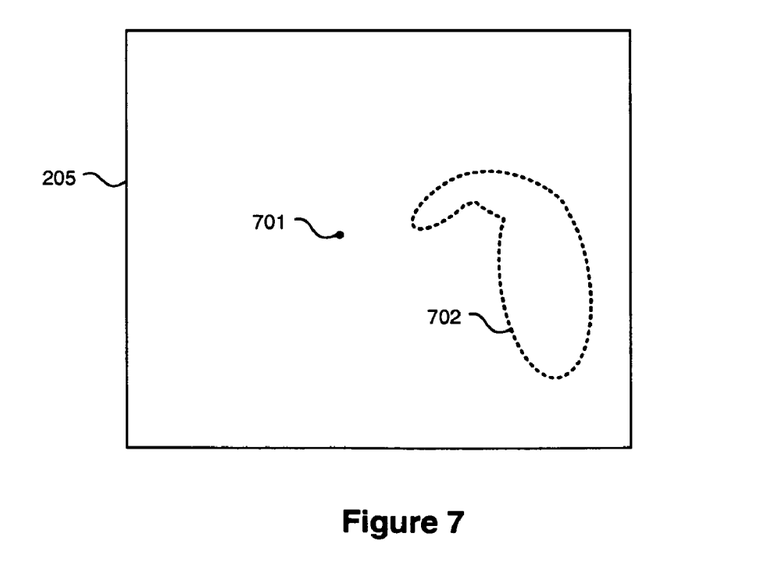
FIG. 7 is a plan view of the touch-sensitive surface of FIG. 6 showing a profile of the user's hand resting on the touch-sensitive surface.

Additional or alternate factors may be used to determine whether non-stylus input should be ignored or filtered. Referring to FIG. 6, when a user is writing on the touch-sensitive surface 205 with the stylus 166, the user would typically rest his or her hand 601 on the touch-sensitive surface 205. Because most users write using a similar grip, the pattern of contact between the hand 601 and the touch-sensitive surface 205 is somewhat predictable. For example, referring to FIG. 7, contact against the touch-sensitive surface 205 by the user's hand 601 may take a shape 702 approximately as shown. The shape of this hand contact profile 702 may be defined by contact of the side of the palm of the hand 601 including the side of the pinkie finger. In addition, it is predictable that, when writing, the position 701 of the tip 201 of the stylus 166 hovering over or contacting the touch-sensitive surface 205 may be positioned approximately as shown to the left of the hand contact profile 702. FIGS. 6 and 7 are illustratively shown for a right-handed user. A left-handed user may produce a mirror image, or some other image, of the hand contact profile 702 with the stylus hover or contact position 701 being to the right of the hand contact profile. For instance, many left-handed users form a "hook" shape with the hand that is not exhibited as often by right-handed users, and such a difference may be accounted for in the expected hand contact profile. The user may be able to input information to the computer 100 indicating whether the user is left-handed or right-handed, thereby aiding in accurate detection. In addition, different profile sets may be stored and used depending upon which user is logged on to the computer 100.

To take advantage of this predictability of hand contact, the touch-sensitive device 165 or the computer 100 may store one or more sample hand contact profiles to be compared with the actual measured hand contact profile 702. For example, a plurality of variations on the shown hand contact profile 702 may be stored. If there is a match (which may be an approximate match), then it may be assumed, and determined, that the user is about to write or is writing with the stylus 166. In response to determining this, any non-stylus user input may be ignored or specially filtered while hand contact with the touch-sensitive surface 205 continues.

An example of how hand, or other non-stylus object, contact profile analysis may be used in conjunction with stylus proximity detection is explained with reference to the illustrative flowchart of FIG. 8. In step 801, non-stylus input to the touch-sensitive device 165 is detected by the touch-sensitive device 165. This non-stylus input may be by a user's hand, finger, or other object other than the stylus 166. In step 802, the touch-sensitive device 165 senses whether the stylus 166 is within the proximity zone 207. This may be done by detecting the distance and/or lateral position of the stylus 166 and determining whether the distance and/or lateral position of the stylus 166 is within the proximity zone 207. Alternatively, this may be done simply by detecting the presence of the stylus 166. In such a case, the mere detected presence of the stylus 166 would means that the stylus 166 is within the proximity zone 207. If it is determined that the stylus 166 is not within the proximity zone 207, then the touch-sensitive device 165 or the computer determines in step 803 whether a predetermined time period has passed since the user last wrote electronic ink using the stylus 166. Alternatively, it may be determined whether the predetermined time period has passed since the stylus 166 last contacted the touch-sensitive surface 205. As yet another alternative, it may be determined whether the predetermined time period has passed since the stylus 166 most recently passed out of the proximity zone 207. The reason for step 803 is to allow for the natural stylus-up action that may occur while a user writes with the stylus 166. A user may be expected to raise the stylus 166 between words and between written lines for short lengths of time. Thus, to reduce the likelihood that the user's unintentional non-stylus inputs are improperly accepted during those short periods while the stylus 166 is raised, a time delay may be introduced before non-stylus input is accepted normally again. The time delay may be of any length, but preferably of a length that is consistent with the amount of time a user may be expected to temporarily raise the stylus in between written words and lines. For example, the time delay may be less than one second, or about one second, or even more than one second.

If it is determined that the time period has passed, then in step 804 the touch-sensitive device 165 or the computer 100 may determined whether the non-stylus input has a pressure that exceeds a threshold pressure P1. Threshold pressure P1 may be set to any value as desired. The lower the value of P1, the easier it is for a user to apply a non-stylus input while the stylus 166 is outside the proximity zone 207. Threshold pressure P1 may be user-defined or software defined. The pressure of an input, whether stylus-based or non-stylus-based, may be determined in any of a number of ways. For instance, pressure may be directly measured or may be indirectly measured as a function of input surface area (e.g., the harder a finger is pressed against the touch-sensitive surface 205, the greater the area of contact), dwell time, and/or capacitance.

Next, in step 805, the touch-sensitive device 165 or the computer 100 may determine whether the non-stylus input is of a shape and/or size that meets certain requirements. For example, the non-stylus input may be compared with one or more pre-stored profiles (such as profile 702) to determine whether there is a match (or approximate match). As previously discussed, it may be desirable to ignore certain non-stylus inputs such as those that appear to be associated with the side of a user's palm that is expected to occur during normal writing activities or while the user is carrying the touch-sensitive device 165 and unintentionally touching the touch-sensitive surface 205. Rotation and/or size differences between the pre-stored profiles and the actual non-stylus input may be accounted for and normalized for comparison purposes. If it is determined that the non-stylus input is of a shape and/or size that is appropriate for accepting as non-stylus input, then the non-stylus input may be accepted in step 806 and used as input to the active software application or the operating system as appropriate for the current contextual use of the computer 100. Thus, the vertical flowchart path from step 801 to step 806 has been described. Other branches of the flowchart will now be described as well.

Referring back to step 804, if it is determined that the non-stylus input pressure does not exceed the threshold pressure P1, then the non-stylus input may be ignored in step 809. Also, in step 805, if it is determined that the non-stylus input is of a shape and/or size that is not appropriate for accepting as non-stylus input, then again the non-stylus input is ignored in step 809.

Referring back to steps 802 and 803, if it is determined that the stylus 166 is within the proximity zone 207 or that the time period in step 803 has passed, then the touch-sensitive device 165 or the computer 100 may determine in step 807 whether the pressure of the non-stylus input exceeds a threshold pressure P2. Threshold pressure P2 may be of any value, but preferably is of a value that is higher than P1. If it is determined that threshold pressure P2 is not exceeded, then the non-stylus input is ignored. Thus, where P1>P2, it is more difficult to unintentionally provide non-stylus input when the stylus 166 is within the proximity zone 207 as compared with when the stylus 166 is outside the proximity zone 207.

However, if the pressure of the non-stylus input exceeds the threshold pressure P2, then the touch-sensitive device 165 and/or the computer 100 may determine in step 808, as in step 805, whether the shape and/or size of the non-stylus input is appropriate for accepting as input. The factors used in the determination in step 808 may be the same as or different from the factors used in the determination in step 805.

Figure 11:
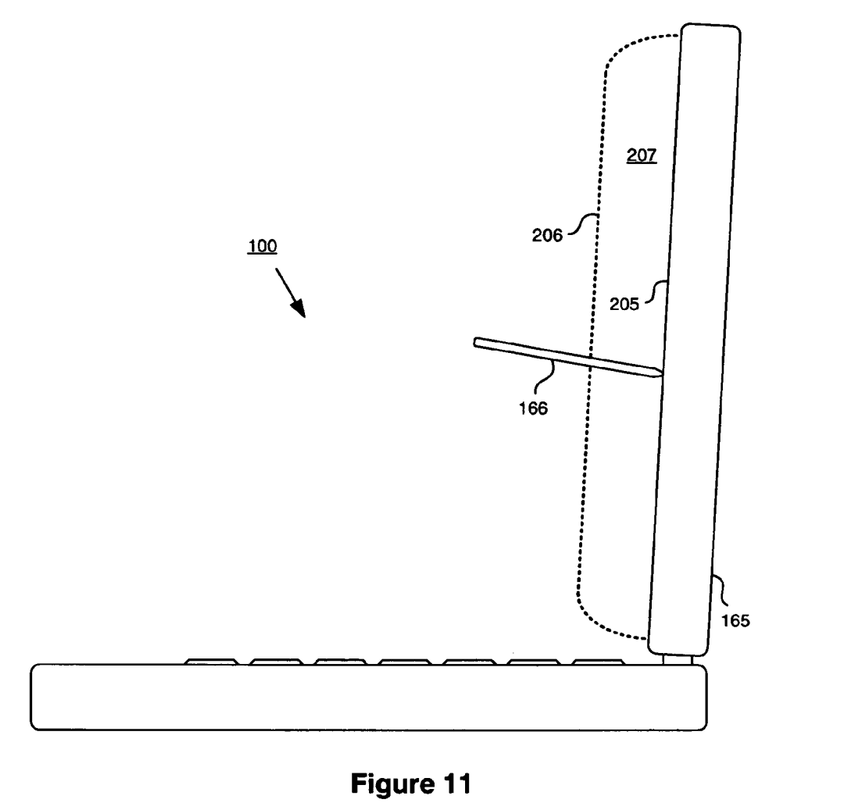
FIG. 11 is a side view of the touch-sensitive device of FIG. 2 showing the touch-sensitive device as part of a computer configured as a laptop.
Figure 12:
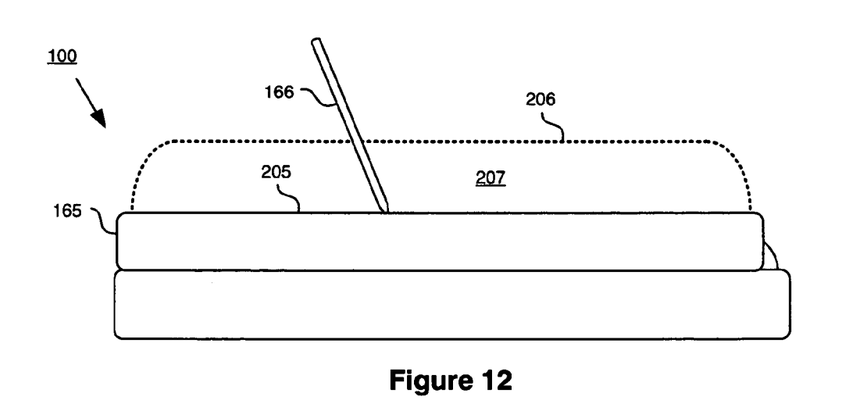
FIG. 12 is a side view of the touch-sensitive device of FIG. 2 showing the touch-sensitive device as part of the computer of FIG. 11 configured as a tablet-style computer.

The value of threshold pressure P2 may be determined by the user and/or automatically by software running on the computer 100. The value of threshold pressure P2 may be automatically determined in accordance with one or more factors, such as which application is in focus and receiving the input, which user is logged on to the computer 100, the physical configuration of the computer 100 (e.g., whether it is configured as a tablet-style computer, a laptop computer, or uses a touch-sensitive CRT monitor), the identity of the particular stylus 166 used, and/or any other factors. In addition, the value of threshold pressure P2 may depend upon other factors such as the configuration of the touch-sensitive device 165. For example, referring to FIG. 11, the touch-sensitive device 165 may be incorporated as part of the computer 100 in a laptop-style configuration or mode where the touch-sensitive surface 205 is in a relatively vertical arrangement. In this case, threshold pressure P2 may have a value that depends upon the fact that the computer 100 is in a laptop-style configuration and/or that the touch-sensitive surface 205 is in a relatively vertical arrangement. Or, referring to FIG. 12, the computer 100 may be in a tablet-style configuration or mode where the touch-sensitive surface 205 is in a relatively horizontal arrangement. In this case, threshold pressure P2 may have a value that depends upon the fact that the computer 100 is in a tablet-style configuration and/or that the touch-sensitive surface 205 is in a relatively horizontal arrangement. Computers that can physically transform between laptop-style and tablet-style configurations are well-known. Using such a transformable computer, threshold pressure P2 (and/or any other threshold properties for a non-stylus input where the stylus 166 is proximate to the touch-sensitive surface 205) may depend upon which configuration the computer is currently in and/or the physical orientation of the touch-sensitive surface 205.

The physical orientation of the touch-sensitive surface 205 may be determined in accordance with one or more sensors in the touch-sensitive device 165 and/or the computer 100, such as an accelerometer chip. In other words, based on the output of such an accelerometer, the touch-sensitive device 165 and/or the computer 100 may be able to determine the particular angle at which the touch-sensitive surface 205 is oriented, or be able to determine which or a plurality of orientation modes the touch-sensitive surface 205 is in (e.g., substantially upright mode versus substantially horizontal mode). The touch-sensitive device 165 and/or the computer 100 may check for the presence of such an accelerometer or other sensor. In the absence of an accelerometer or other sensor, other mechanisms may be used to determine the orientation of the touch-sensitive surface 205. For example, a profile setting that defines the orientation may be persisted in a registry and may be set or read by a software application or the operating system running on the computer 100 and/or the touch-sensitive device 165.

Interaction Areas

Figure 9:
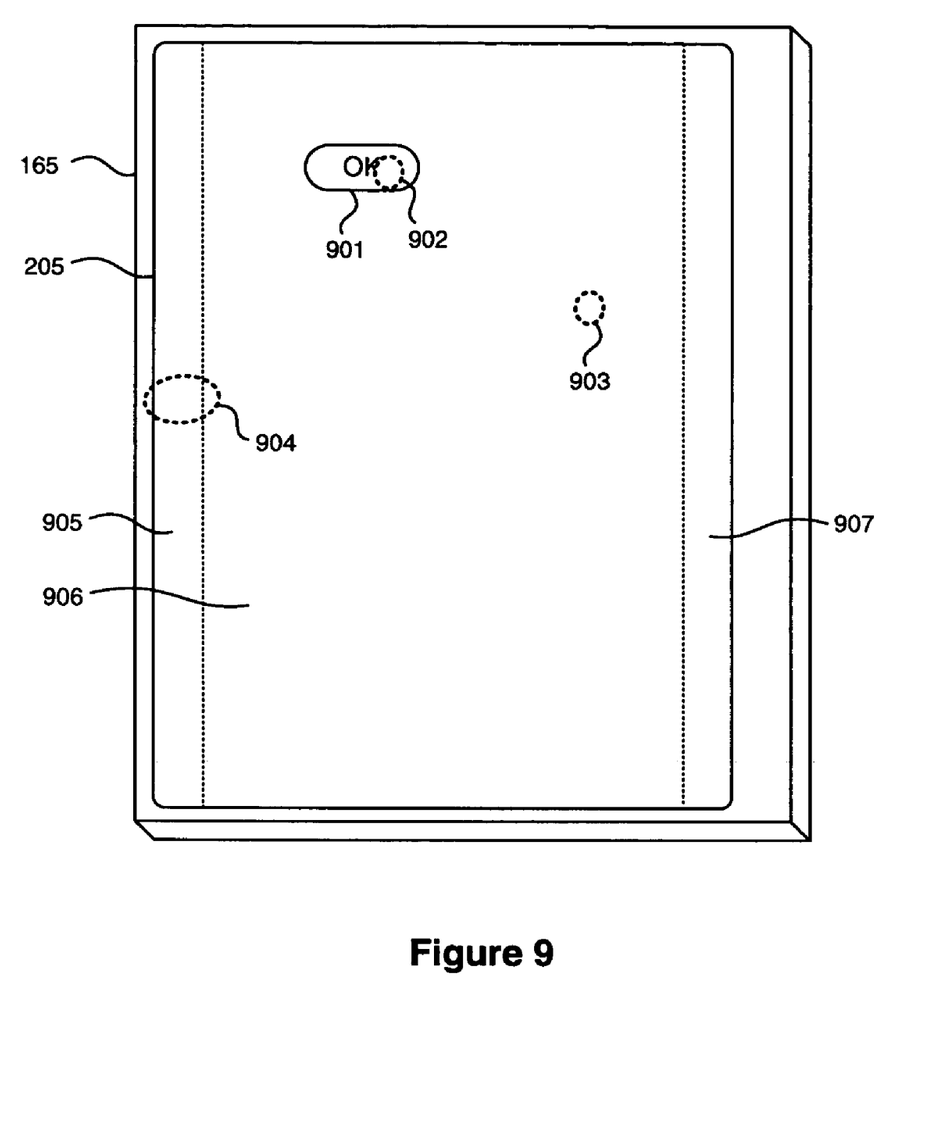
FIG. 9 is a perspective view of the touch-sensitive device of FIG. 2 showing various interaction areas in accordance with aspects of the present invention.

Non-stylus user input may further be ignored and/or specially filtered based on other factors, such as the location of such input on the touch-sensitive surface 205. Referring to FIG. 9, the touch-sensitive device 165 may be integrated with a display, such that a user interface appears to be displayed on the touch-sensitive surface 205. The touch-sensitive surface/display 205 may display one or more controls or other objects such as a button 901, a scroll bar, a drop-down menu, a window, etc. Some of these objects may be user-interactable such that the user may select, drag, open, etc., these objects by making gestures with the stylus 166 and/or a non-stylus object. It may be desirable to differentiate the amount of pressure, shape, size, and/or other properties needed to make a non-stylus input over an object as compared with an area where no object is displayed. For example, it may be desirable to require less pressure in a non-stylus input over an object than over an area having no objects. As an example, the threshold pressure required to successfully make a non-stylus input 902 over the button 901 may be less than or greater than the threshold pressure required to successfully make a non-stylus input 903 in an area where no objects exist. Also, the threshold size required to successfully make a non-stylus input 902 over the button 901 may be less than or greater than the threshold size required to successfully make a non-stylus input 903 in an area where no objects exist.

In addition, the touch-sensitive surface/display 205 may be subdivided into a plurality of areas 905, 906, 907, where the threshold properties required to make a successful non-stylus input may be different from area to area. For example, a non-stylus input 904 made in area 905 may require less or more pressure or size than if the non-stylus input were made in area 906.

Calibration

One or more boundaries of the proximity zone 207 and/or the time delay in step 803 may be set in accordance with calibration procedures. For example, referring to FIG. 10, a calibration mode may be entered in step 1001. In step 1002, the touch-sensitive device 165 or the computer 100 may request the user, via a user interface, to hold the stylus in a particular manner. For example, the user may be requested to hold the stylus 166 with the user's hand resting on the touch-sensitive surface 205 as if the user were about to write with the stylus 166. The touch-sensitive device 165 or the computer 100 may then, in step 1003, measure the distance of the tip 201 of the stylus 166 from the touch-sensitive surface 205. In step 1004, the touch-sensitive device 165 or the computer 100 may additionally or alternatively request the user to write several words, such as a sentence, using the stylus 166 on the touch-sensitive surface 205. In doing, so, the user can be expected to naturally lift the tip 201 of the stylus 166 off the touch-sensitive surface 205 between written words and lines. While the user is doing this, the touch-sensitive device 165 or the computer 100 may measure the distance that the tip 201 travels away from the touch-sensitive surface 205.

Figure 10:
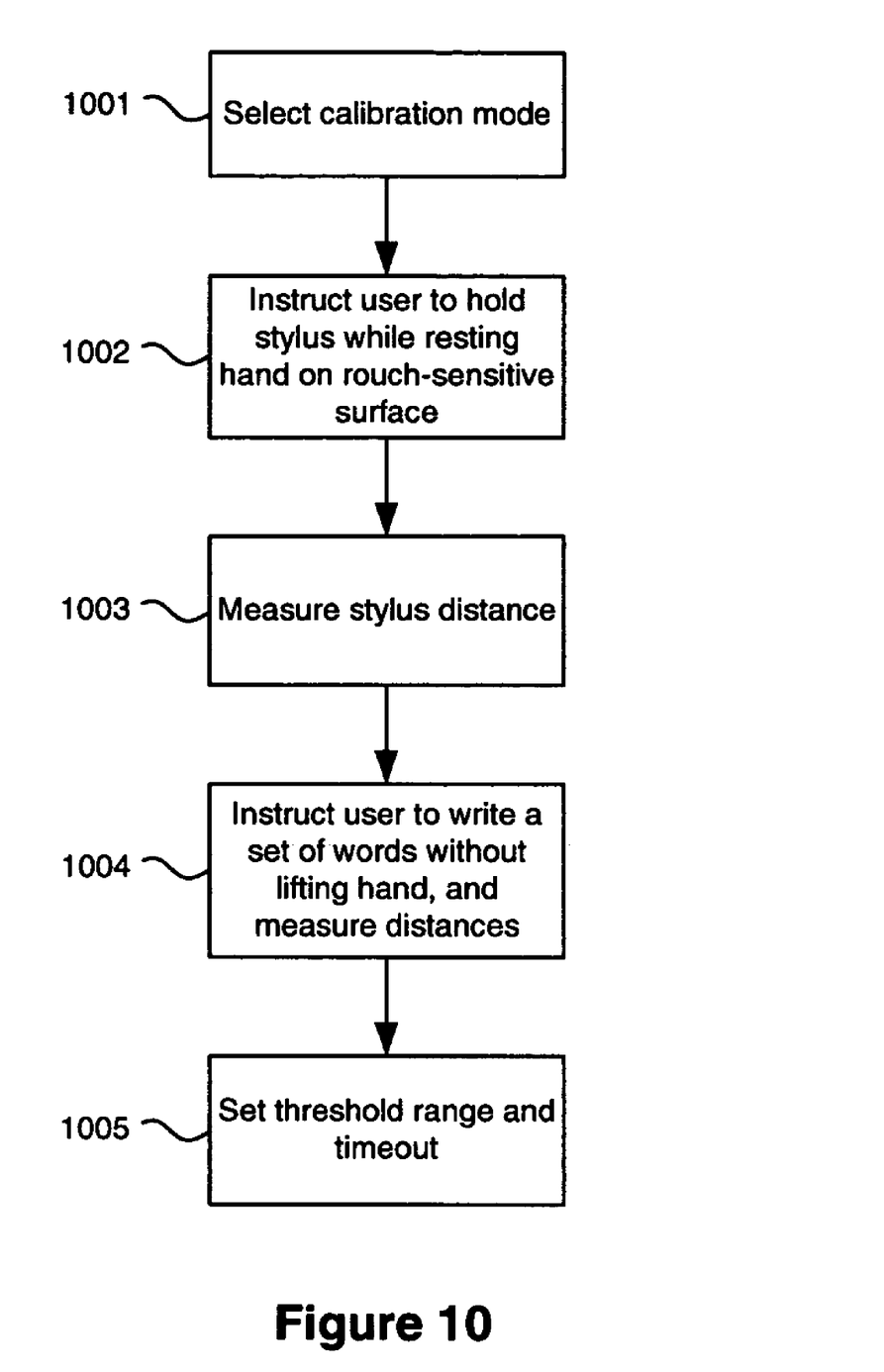
FIG. 10 is a flowchart showing illustrative steps that may be taken to calibrate the touch-sensitive device in accordance with aspects of the present invention.

In step 1005, the touch-sensitive device 165 or the computer 100 may calculate the appropriate distance D (or other parameter(s) defining the proximity zone 207) and/or the time period used in step 803. For example, distance D may be set to be, or otherwise be based on, the maximum, average, etc. distance that the tip 201 moves away from the touch-sensitive surface 205 during writing in step 1004 and/or during resting in step 1003. In some embodiments, distance D may be set to one of these above values plus an additional margin. Similarly, the time period used in step 803 may be set to be, or otherwise be based on, the maximum, average, etc. amount of time that the user removed the tip 201 away from the touch-sensitive surface 205 during the writing in step 1004. By measuring such distances during calibration, the software may create a profile used to help determine whether the user is writing and is thus resting his or her hand on the touch-sensitive surface 205.

CONCLUSION

Thus, the intelligent management of input to a touch-sensitive device has been described. While illustrative embodiments as described herein in accordance with various aspects of the present invention are shown by way of example, it will be understood that the invention is not limited to these embodiments. For example, although the steps in the illustrative flowcharts of FIGS. 5, 8, and 10 are shown in a particular order, the orders of many of these steps may be changed. In addition, some steps may be skipped.

What is claimed is:

1. In a computer having a touch-sensitive surface sensitive to and distinguishing between stylus input and non-stylus input to the surface, a method comprising:
    (a) performing a function responsive to stylus input to the touch-sensitive surface;
    (b) performing the function responsive to non-stylus input to the touch-sensitive surface, when the non-stylus input meets a first threshold touch pressure of the non-stylus input to the touch sensitive surface, and when the stylus is not detected as hovering within a threshold distance from the touch-sensitive surface and the non-stylus input does not match any of a plurality of stored non-stylus input contact shape profiles indicative of ignored non-stylus input when normalized for size and rotation, wherein each shape profile includes a distinct shape of a non-stylus input contact to the touch sensitive surface that is ignored; and
    (c) responsive to the stylus being detected as hovering within a threshold distance, accepting non-stylus input to the touch-sensitive surface when the non-stylus input meets a second threshold touch pressure of the non-stylus input to the touch sensitive surface, the second threshold being different from the first threshold, and when the stylus is detected as hovering within a threshold distance from the touch-sensitive surface and the non-stylus input does not match any of a plurality of stored non-stylus input contact shape profiles indicative of ignored non-stylus input when normalized for size and rotation, wherein each shape profile includes a distinct shape of a non-stylus input contact to the touch sensitive surface that is ignored.

2. The method of claim 1, wherein the stylus input is a movement of the stylus across the touch-sensitive surface, and wherein the non-stylus input is a movement of a non-stylus object across the touch sensitive surface.

3. The method of claim 2, wherein the function is moving a displayed pointer across a display.

4. The method of claim 3, wherein the display and the touch-sensitive surface are integrated as a single touch-sensitive display screen.

5. The method of claim 1, wherein the stylus input is a tap of the stylus upon the touch-sensitive surface, and wherein the non-stylus input is a tap of a non-stylus object upon the touch-sensitive surface.

6. The method of claim 5, wherein the function is selecting a displayed object displayed on a display.

7. The method of claim 1, further including:
providing a user interface requesting a user to hold the stylus in a particular manner;
automatically measuring a distance of the stylus from the touch-sensitive surface; and
setting a range in accordance with the measured distance, the range being related to the threshold distance.

8. The method of claim 1, wherein:
step (b) is further performed responsive to the stylus having been outside the threshold distance for at least a predetermined continuous amount of time, and
step (c) is further performed responsive to the stylus being outside the threshold distance for less than a predetermined continuous amount of time prior to being within the threshold distance.

9. The method of claim 1, further including (c) determining the second threshold based at least upon one of an application currently in focus on the computer, an physical angle of orientation of the touch-sensitive surface, a user currently logged into the computer, or a physical configuration type of the computer.

10. The method of claim 1, the second threshold being a higher pressure than the first threshold.

11. In a computer having a touch-sensitive surface sensitive to and distinguishing between stylus input and non-stylus input to the surface, a method comprising:
(a) performing a function responsive to stylus input to the touch-sensitive surface;
(b) performing the function responsive to non-stylus input to the touch-sensitive surface, (i) when the non-stylus input meets a first threshold touch pressure of the non-stylus input to the touch sensitive surface, the first threshold touch pressure being automatically determined based upon a determined physical angle of orientation of the touch-sensitive surface, (ii) the stylus is not detected as hovering within a threshold distance from the touch-sensitive surface and (iii) the non-stylus input does not match any of a plurality of stored non-stylus input contact shape profiles indicative of ignored non-stylus input when normalized for size and rotation, wherein each shape profile includes a distinct shape of a non-stylus input contact to the touch sensitive surface that is ignored; and
(c) responsive to the stylus being detected as hovering within a threshold distance, accepting non-stylus input to the touch-sensitive surface (i) when the non-stylus input meets a second threshold touch pressure of the non-stylus input to the touch sensitive surface, the second threshold touch pressure being automatically determined based upon a determined physical angle of orientation of the touch-sensitive surface and being different from the first threshold touch pressure, (ii) the stylus is detected as hovering within a threshold distance from the touch-sensitive surface and (iii) the non-stylus input does not match any of a plurality of stored non-stylus input contact shape profiles indicative of ignored non-stylus input when normalized for size and rotation, wherein each shape profile includes a distinct shape of a non-stylus input contact to the touch sensitive surface that is ignored.

12. The method of claim 11, wherein the angle of orientation of the touch-sensitive surface is determined based upon at least one of an accelerometer, a type of the computer, or a stored profile orientation setting.

13. The method of claim 11, further including:
providing a user interface instructing a user to hold the stylus in a certain manner;
measuring a distance of the stylus from the touch-sensitive surface; and
setting the threshold distance in accordance with the measured distance.

14. A computing device having stored computer-executable instructions that, when executed, perform operations comprising:
(a) performing a function responsive to stylus input to a touch-sensitive surface;
(b) performing the function responsive to non-stylus input to the touch-sensitive surface, when the non-stylus input meets a first threshold touch pressure of the non-stylus input to the touch sensitive surface, and when the stylus is not detected as hovering within a threshold distance from the touch-sensitive surface and the non-stylus input does not match any of a plurality of stored non-stylus input contact shape profiles indicative of ignored non-stylus input when normalized for size and rotation, wherein each shape profile includes a distinct shape of a non-stylus input contact to the touch sensitive surface that is ignored; and
(c) responsive to the stylus being detected as hovering within a threshold distance, accepting non-stylus input to the touch-sensitive surface when the non-stylus input meets a second threshold touch pressure of the non-stylus input to the touch sensitive surface, the second threshold being different from the first threshold, and when the stylus is detected as hovering within a threshold distance from the touch-sensitive surface and the non-stylus input does not match any of a plurality of stored non-stylus input contact shape profiles indicative of ignored non-stylus input when normalized for size and rotation, wherein each shape profile includes a distinct shape of a non-stylus input contact to the touch sensitive surface that is ignored.

* * * * *